US008689091B2

(12) United States Patent
Uchida

(10) Patent No.: US 8,689,091 B2
(45) Date of Patent: Apr. 1, 2014

(54) DATA TRANSMITTING DEVICE, DATA RECEIVING DEVICE, DATA TRANSMITTING/RECEIVING DEVICE, AND CONTROLLING METHOD OF DATA TRANSMITTING/RECEIVING DEVICE

(75) Inventor: Kenji Uchida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 171 days.

(21) Appl. No.: 13/343,191

(22) Filed: Jan. 4, 2012

(65) Prior Publication Data

US 2012/0240017 A1    Sep. 20, 2012

(30) Foreign Application Priority Data

Mar. 19, 2011 (JP) ................................. 2011-061820

(51) Int. Cl.
*H03M 13/00* (2006.01)
(52) U.S. Cl.
USPC .............. 714/799; 714/42; 714/704; 714/758
(58) Field of Classification Search
USPC .................................. 714/42, 704, 758, 799
See application file for complete search history.

(56) References Cited

U.S. PATENT DOCUMENTS

| | | | | |
|---|---|---|---|---|
| 5,325,376 | A | * | 6/1994 | Ushio et al. .................... 714/811 |
| 5,787,132 | A | * | 7/1998 | Kishigami et al. ............ 375/354 |
| 5,790,535 | A | * | 8/1998 | Kou .............................. 370/337 |
| 6,263,469 | B1 | * | 7/2001 | Jang .............................. 714/775 |
| 6,982,974 | B1 | | 1/2006 | Saleh et al. |
| 7,283,547 | B1 | | 10/2007 | Hook et al. |
| 7,525,973 | B1 | | 4/2009 | McRae |
| 7,570,555 | B2 | * | 8/2009 | Okazaki et al. ............. 369/47.19 |
| 7,649,280 | B2 | * | 1/2010 | Madigan .......................... 307/17 |
| 7,769,048 | B2 | | 8/2010 | Sharma |
| 7,974,162 | B2 | * | 7/2011 | Okazaki et al. ............. 369/47.28 |
| 8,040,628 | B2 | * | 10/2011 | Tang ................................ 360/51 |
| 8,060,797 | B2 | * | 11/2011 | Hida et al. ..................... 714/704 |
| 2009/0307568 | A1 | | 12/2009 | Takaku |

FOREIGN PATENT DOCUMENTS

| | | |
|---|---|---|
| JP | 2009-294853 A | 12/2009 |
| JP | 2010-011454 A | 1/2010 |
| JP | 2010-61606 A | 3/2010 |

OTHER PUBLICATIONS

Extended European Search Report (EESR) mailed by EPO and corresponding to European Application No. 12151215.6 on May 8, 2012.

* cited by examiner

*Primary Examiner* — Esaw Abraham
(74) *Attorney, Agent, or Firm* — Fujitsu Patent Center

(57) ABSTRACT

In a system, a data receiving device comprises a timing signal generation unit that generates a timing signal used for receiving the divided transmission data in each of the transmission paths, a data receiving unit that receives the divided transmission data transmitted by the data transmitting device for each of the transmission paths by using the timing signal generated by the timing signal generation unit, and an error detection unit that extracts the error detection information from the divided transmission data received for each of the transmission paths by the data receiving unit and detects an error of transmission data included in the divided transmission data by using the extracted error detection information.

7 Claims, 13 Drawing Sheets

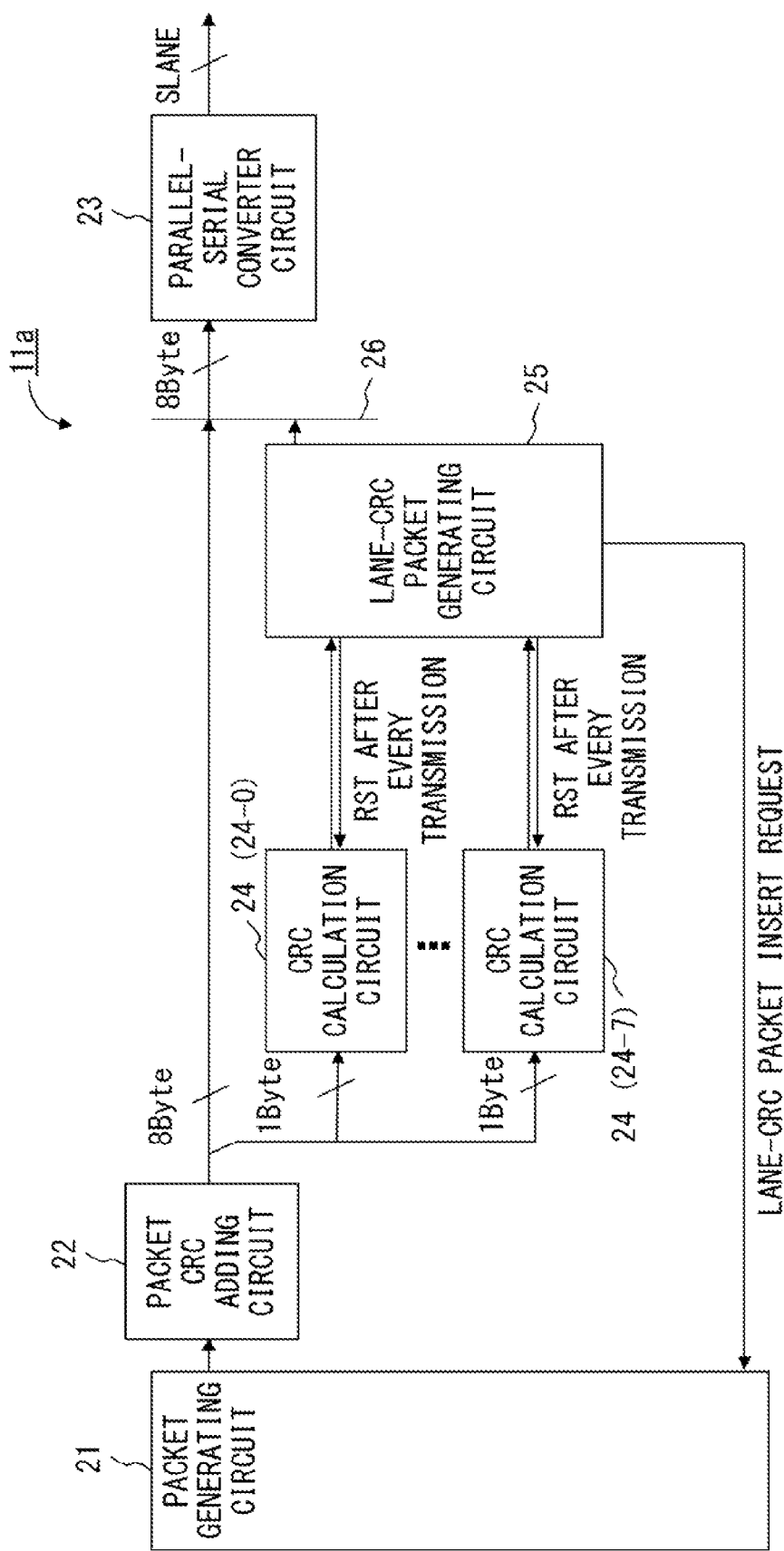
F I G. 2

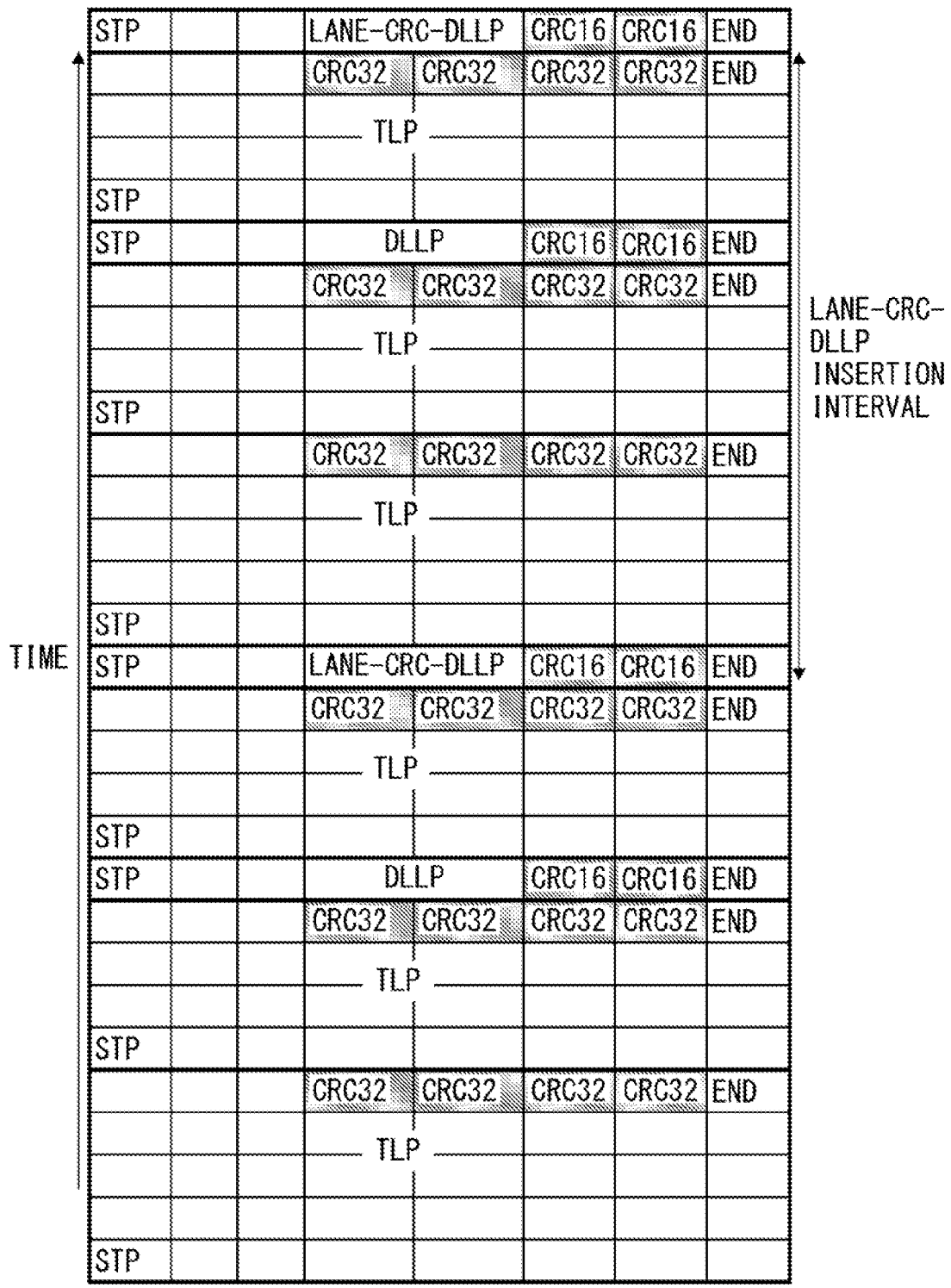
F I G. 7

TRANSMITTER END:

| STP | crc crc | crc crc | crc crc | crc crc | CRC16-1 | CRC16-2 | END |
|---|---|---|---|---|---|---|---|
| TLP23 | TLP24 | TLP25 | CRC32-0 | CRC32-1 | CRC32-2 | CRC32-3 | END |
| TLP15 | TLP16 | TLP17 | TLP18 | TLP19 | TLP20 | TLP21 | TLP22 |
| TLP7 | TLP8 | TLP9 | TLP10 | TLP11 | TLP12 | TLP13 | TLP14 |
| STP | TLP0 | TLP1 | TLP2 | TLP3 | TLP4 | TLP5 | TLP6 |
| STP | DLLP0 | DLLP1 | DLLP2 | DLLP3 | CRC16 | CRC16 | END |
| STP | TLP24 | TLP25 | CRC32-0 | CRC32-1 | CRC32-2 | CRC32-3 | END |
| TLP23 | TLP16 | TLP17 | TLP18 | TLP19 | TLP20 | TLP21 | TLP22 |
| TLP15 | TLP8 | TLP9 | TLP10 | TLP11 | TLP12 | TLP13 | TLP14 |
| TLP7 | TLP0 | TLP1 | TLP2 | TLP3 | TLP4 | TLP5 | TLP6 |
| STP | TLP32 | TLP33 | CRC32-0 | CRC32-1 | CRC32-2 | CRC32-3 | END |
| TLP31 | TLP24 | TLP25 | TLP26 | TLP27 | TLP28 | TLP29 | TLP30 |
| TLP23 | TLP16 | TLP17 | TLP18 | TLP19 | TLP20 | TLP21 | TLP22 |
| TLP15 | TLP8 | TLP9 | TLP10 | TLP11 | TLP12 | TLP13 | TLP14 |
| TLP7 | TLP0 | TLP1 | TLP2 | TLP3 | TLP4 | TLP5 | TLP6 |

FIG. 8A

| TRANSMISSION PATH : | STP | crc crc | crc crc | crc crc | crc crc | CRC16-1 | CRC16-2 | END |
|---|---|---|---|---|---|---|---|---|
| | TLP23 | TLP24 | TLP25 | CRC32-0 | CRC32-1 | CRC32-2 | CRC32-3 | END |
| | TLP15 | TLP16 | TLP17 | TLP18 | TLP19 | TLP20 | TLP21 | TLP22 |
| | TLP7 | TLP8 | TLP9 | TLP10 | TLP11 | TLP12 | TLP13 | TLP14 |
| | STP | TLP0 | TLP1 | TLP2 | TLP3 | TLP4 | TLP5 | TLP6 |
| | STP | DLLP0 | DLLP1 | DLLP2 | DLLP3 | CRC16 | CRC16 | END |
| | TLP23 | TLP24 | TLP25 | CRC32-0 | CRC32-1 | CRC32-2 | CRC32-3 | END |
| | TLP15 | TLP16 | TLP17 | TLP18 | TLP19 | TLP20 | TLP21 | TLP22 |
| | TLP7 | TLP8 | TLP9 | TLP10 | TLP11 | TLP12 | TLP13 | TLP14 |
| | STP | TLP0 | TLP1 | TLP2 | TLP3 | TLP4 | TLP5 | TLP6 |
| | TLP31 | TLP32 | TLP33 | TLP26 | TLP27 | TLP28 | TLP29 | END |
| | TLP23 | TLP24 | TLP25 | TLP18 | TLP19 | TLP20 | TLP21 | TLP30 |
| | TLP15 | TLP16 | TLP17 | TLP10 | TLP11 | TLP12 | TLP13 | TLP22 |
| | TLP7 | TLP8 | TLP9 | TLP2 | TLP3 | TLP4 | TLP5 | TLP14 |
| | STP | TLP0 | TLP1 | | | | | TLP6 |

TEMPORAL FAILURE IN LANE #0

DATA TRANSMITTING DEVICE, DATA RECEIVING DEVICE, DATA TRANSMITTING/RECEIVING DEVICE, AND CONTROLLING METHOD OF DATA TRANSMITTING/RECEIVING DEVICE

CROSS-REFERENCE TO RELATED APPLICATION

This application is based upon and claims the benefit of priority of the prior Japanese Patent Application No. 2011-061820, filed on Mar. 19, 2011, the entire contents of which are incorporated herein by reference.

FIELD

The present embodiment relates to a data transmitter device, a data receiving device, a data transmitting/receiving device, and a controlling method of the data transmitting/receiving device.

BACKGROUND

In recent years, computers (data processing devices) used for servers and the like usually adopt a configuration in which plural CPUs (Central Processing Units) are connected by buses. In such a configuration, a CPU that carries a data transmitting/receiving device is adopted to transmit and receive data through a bus.

The bus is a transmission path group having plural transmission paths. Each of the transmission paths is a differential transmission path (lane) having two transmission lines driven by differential drive. This lane of the differential transmission path is adapted to speeding up owing to less noise generation than the lane of single-end transmission path, although it requires two transmission lines for serial connection with a data width of 1 bit.

When the data transmitting/receiving device loaded in the CPU transmits data through a bus, data to be transmitted is divided for each lane and the divided data is serially transmitted. The data transmitting/receiving device usually adds an error-detecting code for error detection to the data to be transmitted so that the receiver end can detect an error caused at the data reception. A CRC (Cyclic Redundancy Check) has been widely used as an error-detecting code.

This error-detecting code is usually generated by using all of the data to be transmitted. For that reason, the receiver end generates an error-detecting code by using received data other than the error-detecting code and compares the generated error-detecting code (CRC code) with the received error-detecting code. As a result of this comparison, when the two error-detecting codes match, it is regarded in such a case that no error has occurred, and when the two error-detecting codes do not match, it is regarded in such a case that an error occurred. When the receiver end finds that an error has occurred, the receiver end discards the received data and requests the retransmission of the data to the transmitter end.

The data transmission between CPUs significantly influences the data processing speed of the CPU and the throughput of the data processing device (computer) loading the CPUs. For this reason, the requirement of the high-speed data transmission is significantly high. However as the transmission speed becomes higher, the influence of the noise also becomes greater. As a result, the requirement of stable operations becomes significantly high.

The above lanes can be independently operated. Therefore when a failure occurs in any of the lanes, degeneracy to stop the failed lane is performed. This is because it is highly probable that errors will occur in the data transmission in the failed lane.

The receiver end can detect an error in units of packets by using the error-detecting code. However, the receiver end cannot identify the lane in which the error occurred. For that reason, in the past, the lane in which a failure (error) occurred was identified by transmitting and receiving data (patterns) prepared in advance. The data prepared in advance is, for example, a PBRS (Pseudo Random Binary (bit) Sequence) pattern.

The transmission and reception of such data prepared in advance has to be performed after stopping the operation of the system (data processing device). The operation stoppage of the data processing device decreases the operation time of the data processing device, and thus blocks efficient operation of the data processing device. For that reason, it is important to identify the lane in which a failure (error) has occurred during the operations of the data processing device.

The waveform distortion of the data transmission in each lane, i.e., the influence of noise, is not always the same. It is possible for the data reception characteristics to be different in each lane due to the variation of the processes. For that reason, errors may be concentrated on a particular lane in which a failure has not occurred. In order to identify a lane with highly frequent error occurrences, it is desirable to have a mechanism to detect an error in units of lanes during the operations of the data processing device.

Technical documents for reference include Japanese Laid-open Patent Publication No. 2010-61606, Japanese Laid-open Patent Publication No. 2009-294853, and Japanese Laid-open Patent Publication No. 2010-11454.

SUMMARY

According to an aspect of the invention, a data receiving device comprises a timing signal generation unit that generates a timing signal used for receiving the divided transmission data in each of the transmission paths, a data receiving unit that receives the divided transmission data transmitted by the data transmitting device for each of the transmission paths by using the timing signal generated by the timing signal generation unit, and an error detection unit that extracts the error detection information from the divided transmission data received for each of the transmission paths by the data receiving unit and detects an error of transmission data included in the divided transmission data by using the extracted error detection information.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is a diagram explaining a configuration of the data transmitting device according to the present embodiment;

FIG. 7 is a diagram explaining a method of insertion control of the LANE-CRC-DLLP;

FIG. 8A is a diagram explaining error detection performed for each lane using the LANE-CRC-DLLP (transmitter end);

FIG. 8B is a diagram explaining error detection performed for each lane using the LANE-CRC-DLLP (transmission path);

FIG. 8C is a diagram explaining error detection performed for each lane using the LANE-CRC-DLLP (receiver end)

DESCRIPTION OF EMBODIMENTS

In the following description, details of the embodiments of the present invention are explained with reference to the drawings.

Figure 1:
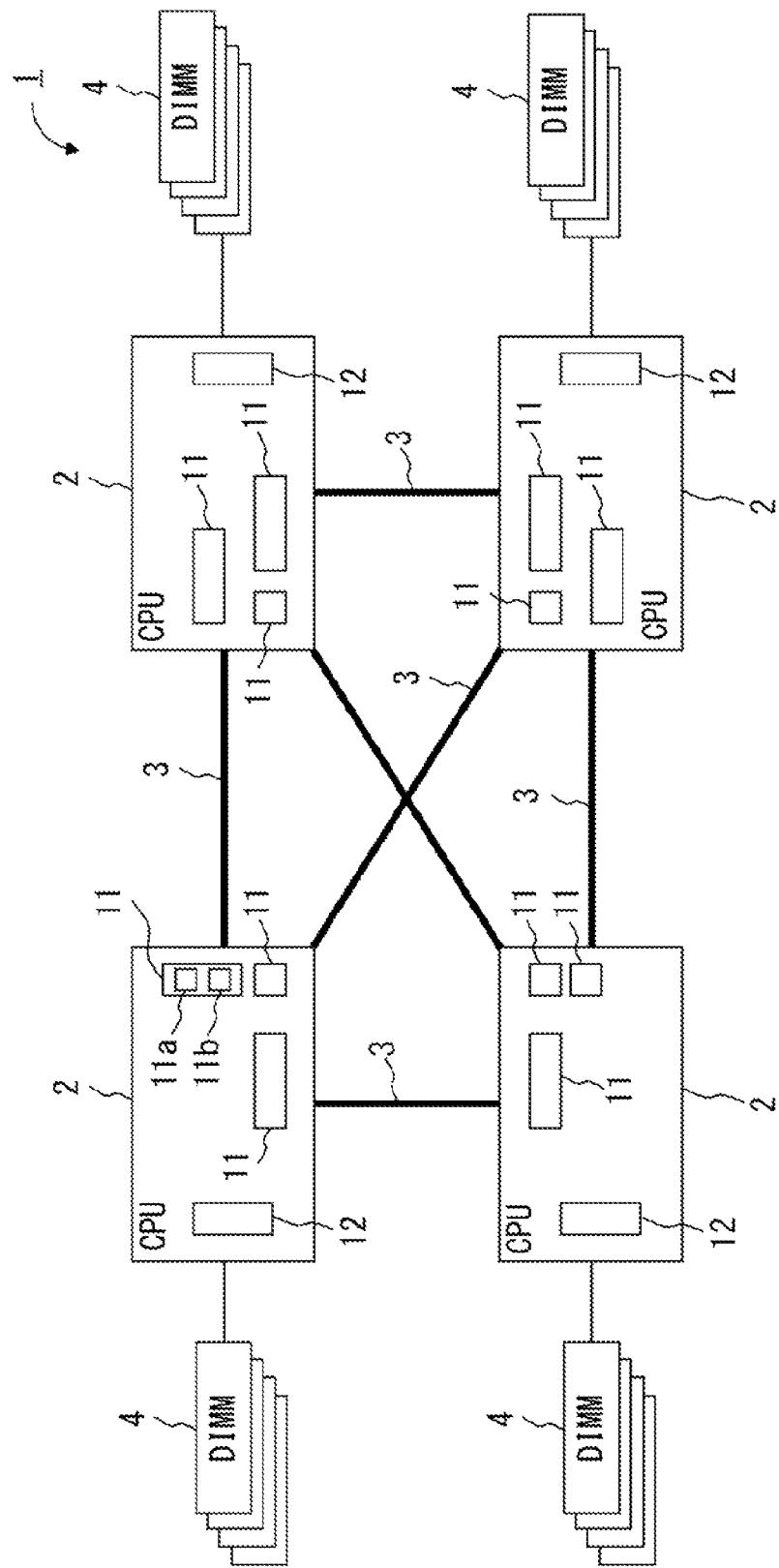
FIG. 1 is a diagram explaining an example of the configuration of the data processing device (computer) in which a data transmitter/receiving device according to the present embodiment is adopted.

FIG. 1 is a diagram explaining an example of the configuration of the data processing device (computer) in which a data transmitting/receiving device according to the present embodiment is adopted. This data processing device 1 includes four CPUs (Central Processing Units) 2 as processors that are arithmetic processing units, and a bus 3 connects between the CPUs 2. Each of the CPUs 2 is connected to plural memory modules 4 indicated by "DIMM (Dual Inline Memory Module)" in FIG. 1. As a result, plural data transmitting/receiving devices 11 according to the present embodiment and MC (Memory Controller) 12 for accessing the memory modules 4 are mounted on each of CPUs 2. The processor according to the present embodiment is realized by plural data transmitting/receiving devices 11 according to the present embodiment being mounted on a single CPU 2. Application of the data transmitting/receiving device 11 according to the present embodiment to the data processing device 1 is realized by employing plural CPUs 2.

Although it is not illustrated in FIG. 1, the data processing device 1 is accessible to a storage storing target data of data processing, or can receive data from outside. In addition, the data processing device 1 has a component for controlling from the outside. However, as these components are not important in the explanation, details of these components are omitted.

Figure 4:
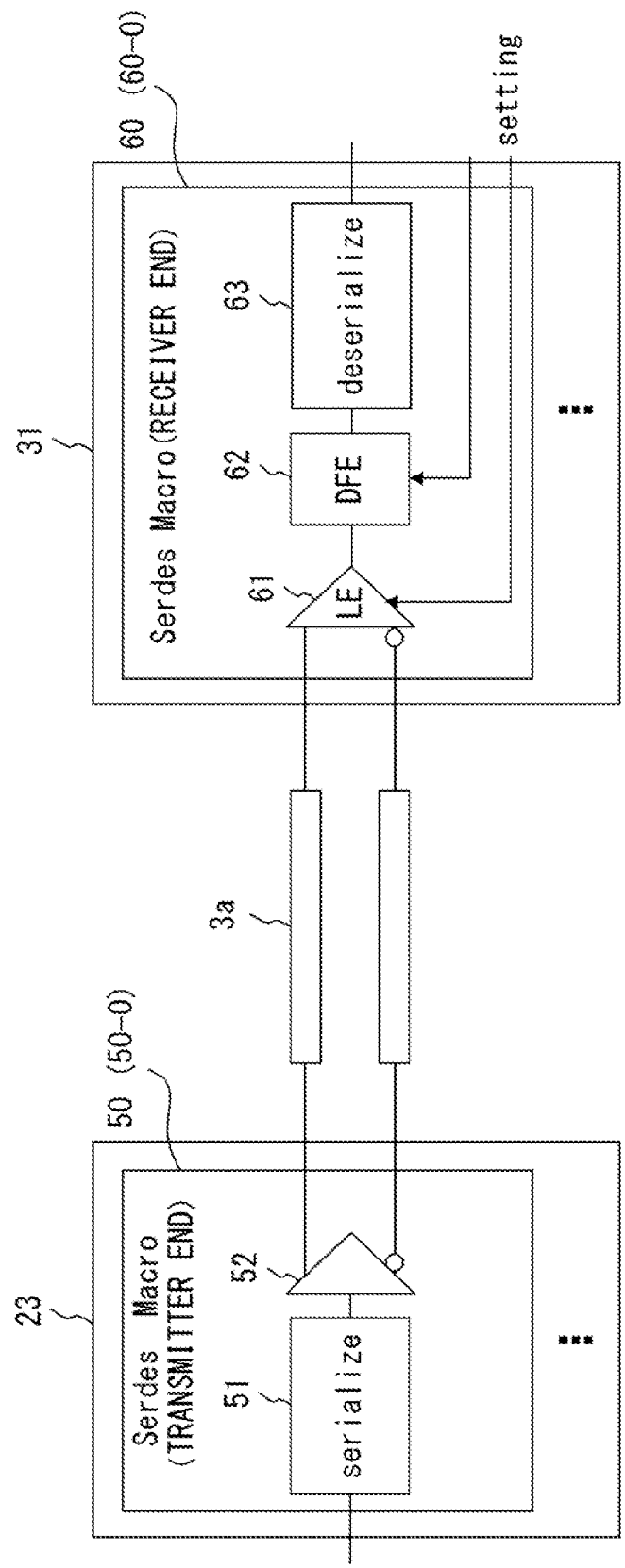
FIG. 4 is a diagram explaining details of the transmission system.

The bus 3 includes plural transmission paths and each of the plural transmission paths is capable of bidirectional data transmission and reception. For that reason, each of the data transmitting/receiving devices 11 mounted on the CPU 2 includes a data transmitting device 11a for transmitting data and a data receiving device 11b for receiving data. Each of the transmission paths is a differential transmission path (lane) having two differential drive transmission lines (FIG. 4). Here, the number of lanes is eight.

In the data processing device 1 illustrated in FIG. 1, each of the CPUs 2 performs data processing by using the memory module 4 so that the CPU 2 can make a direct access. In each of the CPUs 2, when data necessary for executing data processing is stored in a different CPU 2, the necessary data is obtained by data transmission and reception through the bus 3 that connects to the different CPUs 2. In this manner, each of the CPUs 2 executes data processing using the memory module that the CPU 2 controls itself while transmitting and receiving data through the bus 3 as needed.

There are three types of packets transmitted and received between the CPUs 2. The three types of packets include TLP (Transaction Lay Packet) used for transmitting and receiving data, DLLP (Data Link Layer Packet) used supplementarily for transmittal confirmation of the TLP, transmission of control information, and the like, and PLP (Physical Layer Packet) for executing processing that has less of a load than the processing of transmitted and received data such as power control and phase adjustment.

A framing character is added to all types of packets at the head and the tail. Afterward, the framing character added to the head is represented as STP and the framing character added to the tail is represented as END.

An error-detecting code for detecting an error that has occurred at the reception of a packet is included in all types of the packets. Owing to this error-detecting code, error can be detected by the packet. In the present embodiment, in order to detect error for each lane, a packet storing an error-detecting code to detect error for each lane is transmitted from the transmission end. The error-detecting code for detecting error for each lane is stored in DLLP. Such a DLLP is hereinafter referred to as "LANE-CRC-DLLP" to distinguish the DLLP from other DLLPs.

Figure 3A:
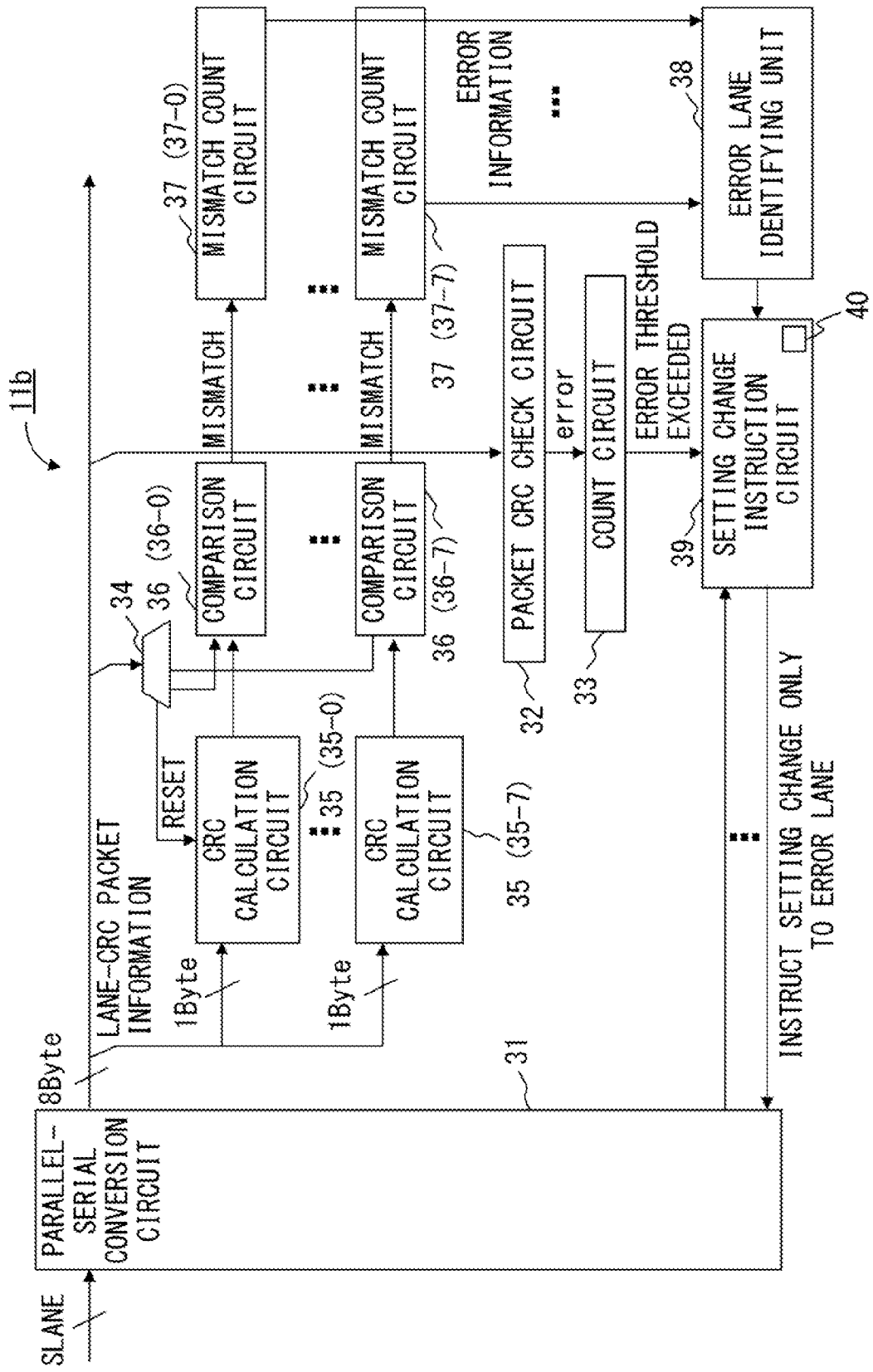
FIG. 3A is a diagram explaining a configuration of the data receiving device according to the present embodiment.
Figure 3B:
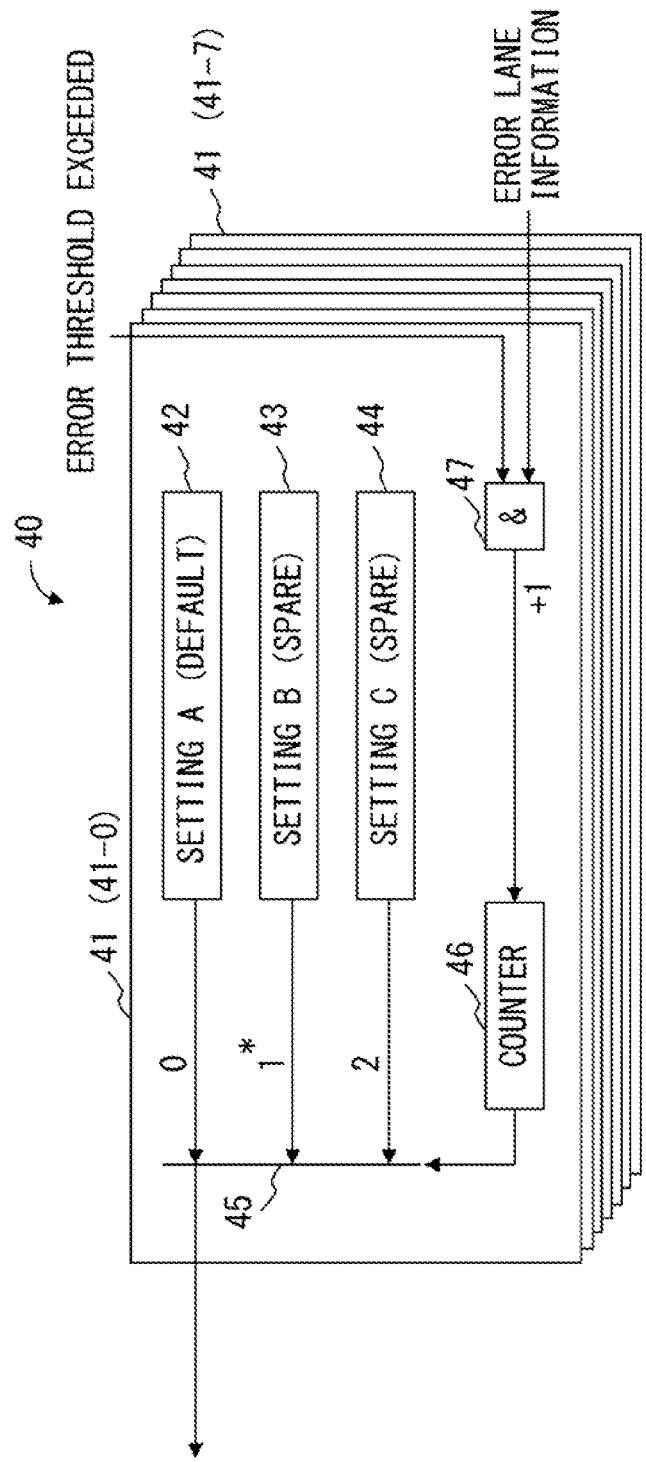
FIG. 3B is a diagram explaining a configuration of the setting designation unit.
Figure 5:
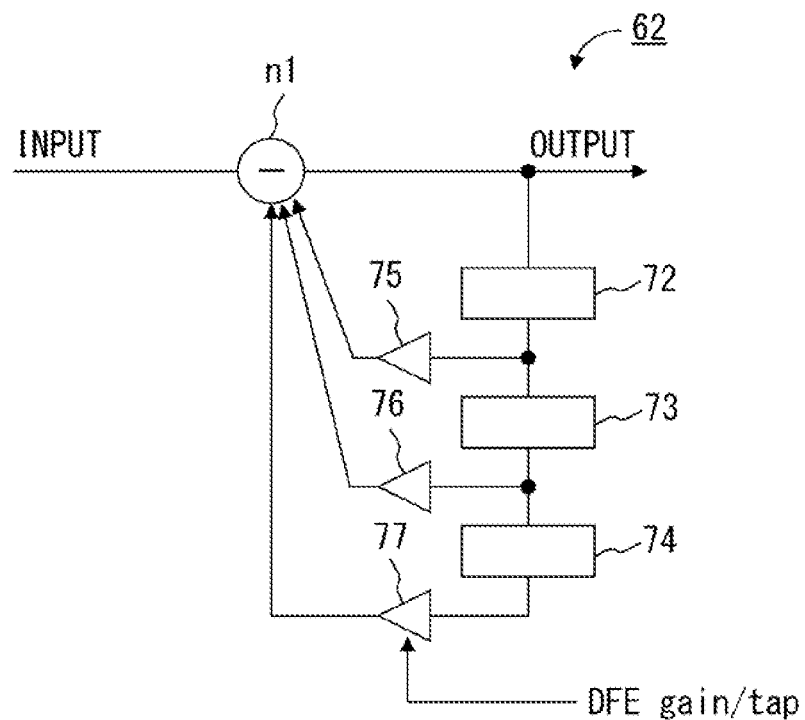
FIG. 5 is a diagram explaining a configuration of the DFE.

The data transmitting device 11a according to the present embodiment generates and transmits the LANE-CRC-DLLP. A configuration illustrated in FIG. 2 and FIG. 4 is adopted to the data transmitting device 11a. The data receiving device 11b of the present embodiment receives the LANE-CRC-DLLP and identifies the lane in which an error occurred. A configuration illustrated in FIG. 3 to FIG. 5 is adopted in the data receiving device 11b. Here, in order to facilitate understanding of the present embodiment, details of a LANE-CRC-DLLP generation method and a mechanism of error detection for each lane using the LANE-CRC-DLLP are explained with reference to FIG. 6A to FIG. 8C before referencing FIG. 2 to FIG. 5.

Figure 6A:
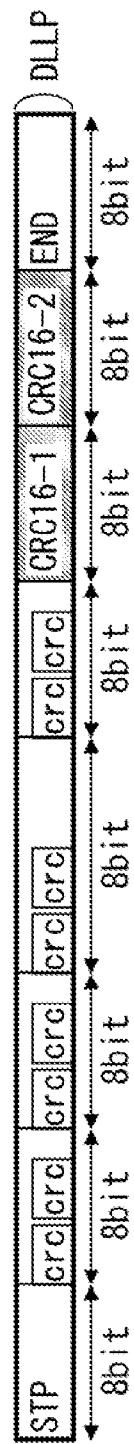
FIG. 6A is a diagram explaining a structure of LANE-CRC-DLLP.
Figure 6B:
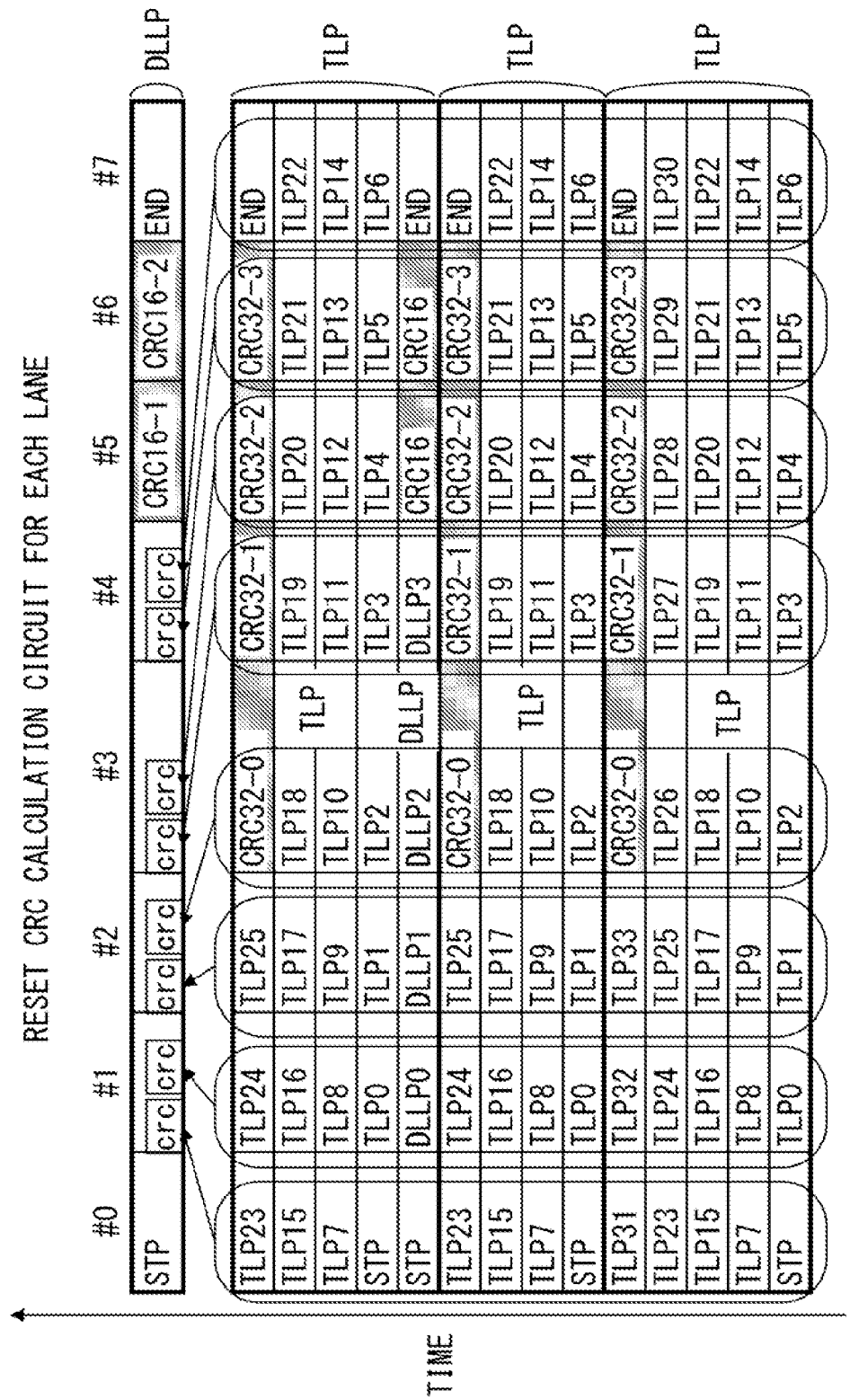
FIG. 6B is a diagram explaining a transmission range covered by a single LANE-CRC-DLLP.

FIG. 6A is a diagram explaining a structure of LANE-CRC-DLLP, and FIG. 6B is a diagram explaining a transmission range covered by the LANE-CRC-DLLP. Each of "#0" to "#7" in FIG. 6B denotes different lanes.

Here, it is assumed that each lane serially transmits data on an 8-bit basis. The STP is assigned to the first 8 bits of the packet, and the END is assigned to the last 8 bits of the packet, which is not only for the LANE-CRC-DLLP. A CRC code serving as an error-detecting code is 16-bit data, and this CRC code is placed before the END.

"CRC 16" in FIG. 6A and FIG. 6B represents a 16-bit CRC code and "CRC16-0" and "CRC16-1" represents the first 8 bits of the CRC code and the remaining 8 bits of the CRC code, respectively. This is the same for "CRC32", and "CRC32-0" to "CRC32-4". In addition, "TLP0" to "TLP33" represent 8-bit data obtained by dividing the TLP, except for the STP and the END. This 8-bit data is a unit of data for data transmission. Similarly, "DLLP0" to "DLLP3" represent 8-bit data obtained by dividing a DLLP except for the STP and the END. Therefore, each row in FIG. 6B represents a lane in which data transmission is performed and each column in FIG. 6B represents unit data to be transmitted in one data transmission.

As illustrated in FIG. 6A and FIG. 6B, since the DLLP stores the STP, the END and a 16-bit CRC code, the available region in an 8-byte DLLP is 4 bytes between the STP and the 16-bit CRC code. For this reason, the present embodiment calculates 4-bit CRC codes for each lane and stores 8 lanes of the CRC codes in a LANE-CRC-DLLP as 4-byte data between the STP and the 16-bit CRC codes.

In a TLP, a packet identifying sequence number, a header unit, a data unit, and a CRC code are placed between the STP and the END. In a basic structure of the DLLP, 1 byte of type data representing a type, 3 bytes of a data unit, and 2 bytes of CRC code are placed between the STP and the END. The present embodiment secures 4 bytes of a data unit in the LANE-CRC-DLLP by using the STP as type data.

The transmitter end resets the calculation of a CRC code for each lane in response to the transmission of the LANE-CRC-DLLP. In order to avoid the false-negative in error detection for each lane, the transmitter end calculates a CRC code by using the transmitted data for each lane immediately after transmitting a LANE-CRC-DLLP until transmission of the next LANE-CRC-DLLP. As a result, each LANE-CRC-DLLP covers from a packet located immediately after the immediately preceding LANE-CRC-DLLP to a packet located immediately before.

FIG. 7 is a diagram explaining a method of insertion control of the LANE-CRC-DLLP.

The LANE-CRC-DLLP is generated and transmitted every time a set insertion interval elapses. The insertion interval is designated in accordance with time or the number of packets and can be changed arbitrarily. As a result, the LANE-CRC-DLLP can be transmitted anytime in accordance with the set insertion interval. The reason that the insertion interval can be arbitrarily changed is to enable the adjustment in accordance with the number of packets transmitted and received within a unit of time or frequency of error occurrences. The frequency of error occurrences can be identified by using the CRC code stored in the packet.

Figure 8C:
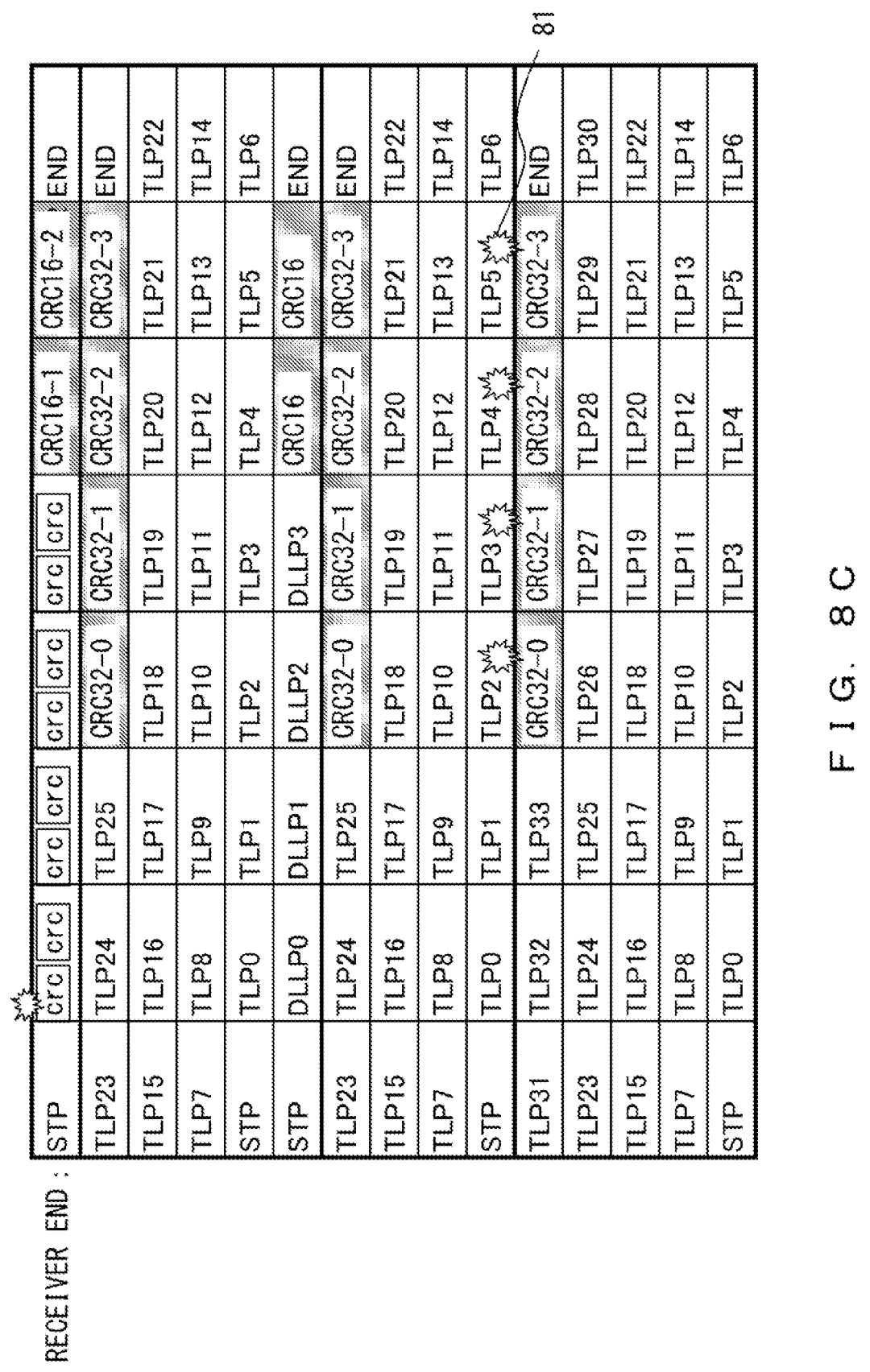

FIGS. 8A through 8C are a diagram explaining error detection performed for each lane using the LANE-CRC-DLLP. "Transmission path" denoted in FIG. 8B corresponds to the bus 3 in FIG. 1. In FIG. 8B and FIG. 8C, data in which an error occurred or a CRC code representing the error occurrence are indicated by a marking 81. Similarly to FIG. 6B, the rows and columns in FIGS. 8A through 8C represent lanes in which data transmission is performed and unit data to be transmitted in one data transmission, respectively.

FIGS. 8A through 8C illustrates an example case in which a temporary failure occurred in a lane represented by "#0". When a temporary failure occurs in this lane and an error occurs in the transmission of data TLP7, TLP15 and TLP23 in the same TLP, CRC32-0 to CRC32-3 of the TLP do not match the CRC codes calculated from the received data TLP0 to TLP33. For that reason, the receiver end can detect errors that have occurred in this TLP. However, the lane in which the error occurred cannot be identified from the CRC32-0 to CRC32-3.

Similarly to the transmitter end, the receiver end calculates the CRC code for each lane by using data receiving in the lane. Consequently, when the LANE-CRC-DLLP is received, the receiver end associates the CRC code calculated for each lane with the CRC code for each lane stored in the received LANE-CRC-DLLP and compares those CRC codes. As a result of the comparison, a lane in which the CRC codes do not match is regarded as a lane in which an error has occurred. When an error has occurred in the transmission in a line "#0" due to a temporary failure, the compared CRC codes do not match in the lane "#0" so that the receiver end can identify that an error occurred in the lane "#0". A packet in which an error has occurred can be identified from the CRC code stored in another packet (TLP in this case). The error that occurred in receiving the LANE-CRC-DLLP can be detected by using the CRC code stored in the LANE-CRC-DLLP. For that reason, the receiver end can recognize an error occurrence in at least one of the data TLP7, TLP15, TLP23, and TLP31.

In high-speed serial transmission, data is scrambled at the transmitter end and is descrambled at the receiver end for noise suppression. Moreover, parallel-serial conversion of data is performed at the transmitter end, and serial parallel conversion of data is performed at the receiver end. These operations are omitted in FIG. 8A and FIG. 8C for descriptive purposes.

As described above, the transmitter end generates and transmits a LANE-CRC-DLLP, thereby enabling the receiver end to identify a lane in which an error has occurred. Since CRC codes are stored in other packets, a packet in which the error occurred can be identified. For that reason, if a packet in which an error occurred is stored or the same packet received in a normal manner is stored, analysis can be performed in consideration of the lane with error occurrence.

Because identification of lanes in which an error occurred (including a failed lane) can be performed through transmission and reception of packets, it is not necessary to stop the operations of the data processing device 1 (system) to identify the lanes in which the error occurred. Therefore the time required to handle the lanes in which an error occurred can be kept to the minimum. In other words, the shutdown time period of the data processing device 1 can be kept to the minimum, but the operating time period can be maximized. As a result, more efficient operations of the data processing device 1 can be achieved.

In the following descriptions, details of the data transmitting/receiving device 11 according to the present embodiment that enables transmission and reception of the above-described LANE-CRC-DLLP and a data transmitting/receiving device are explained.

FIG. 2 is a diagram explaining a configuration of the data transmitting device according to the present embodiment. As illustrated in FIG. 2, the data transmitting device 11a includes a packet generating circuit 21, a packet CRC adding circuit 22, a parallel-serial converter circuit 23, eight CRC calculation circuits 24 (24-0 to 24-7), each being provided in each lane, a LANE-CRC packet generating circuit 25, and a selector 26.

The packet generating circuit 21 receives inputs of transmission target data and a transmission instruction from a CPU core, for example, of the CPU 2 on which the packet generating circuit 21 is mounted, and generates a packet storing the input data. The packet CRC adding circuit 22 receives an input of the packet generated by the packet generating circuit 21, calculates a CRC code, which is one of the error-detecting codes, by using the entire input packet, and adds the obtained CRC code to the packet. Consequently, the packet CRC adding circuit 22 outputs a packet to which a CRC code is added. It should be noted that there are a number of types of algorithms for obtaining the CRC code, and the algorithm types are not limited in particular. In addition, the error-detecting code itself is not limited to the CRC code. In other words, other types of error-detecting codes such as a parity code or checksum can be used.

The packet to which the CRC code is added by the packet CRC adding circuit 22 is output in a parallel manner to an 8-byte transmission path. This data in 8-byte units is input to the selector 26 and each of the CRC calculation circuits 24-0 to 24-7.

Each of the CRC calculation circuits 24-0 to 24-7 inputs 1-byte data corresponding to each CRC calculation circuit itself from the 8-byte data and calculates a 4-bit CRC code. The calculation of the CRC code is performed every time the packet CRC adding circuit 22 outputs 8-byte data. Consequently, the CRC codes of eight lanes stored in the LANE-CRC-DLLP are calculated by each of the CRC calculation circuits 24-0 to 24-7.

The LANE-CRC packet generating circuit 25 is a circuit to generate the LANE-CRC-DLLP. For example, it includes a counter for timekeeping of the insertion interval illustrated in FIG. 7. With this counter, when an insertion interval elapses from the generation and output of the immediately preceding LANE-CRC-DLLP, the LANE-CRC packet generating circuit 25 inputs the CRC code calculated by each of the CRC calculation circuits 24-0 to 24-7. Consequently, the LANE-CRC packet generating circuit 25 calculates a 2-byte CRC code by using the inputted CRC code and generates a LANE-CRC-DLLP illustrated in FIG. 6A by using the calculated CRC code.

The LANE-CRC packet generating circuit 25 makes a LANE-CRC packet insertion request for transmission of the LANE-CRC-DLLP to the packet generating circuit 21 when the above insertion interval elapses. In response to the LANE-CRC packet insertion request, the packet generating circuit 21 performs switching to cause the selector 26 to select the LANE-CRC packet generating circuit 25. If a packet is currently transmitted, the switching is performed after the completion of the transmission of the packet. Consequently, the LANE-CRC-DLLP is transmitted from the transmitter end on the basis of the set insertion interval. Because the switching of the selector 26 by the packet generating circuit 21 is necessary, generation of the LANE-CRC-DLLP of the LANE-CRC packet generating circuit 25 is performed in time with the switching.

The LANE-CRC packet generating circuit 25 resets each of the CRC calculation circuits 24-0 to 24-7 after outputting the LANE-CRC-DLLP to the selector 26. As a result, each of the CRC calculation circuits 24-0 to 24-7 calculates a CRC code by using data input from the packet CRC adding circuit 22 after the transmission of the LANE-CRC-DLLP.

After the completion of the output of the LANE-CRC-DLLP to the parallel-serial conversion circuit 23, switching to cause the selector 26 to select the packet CRC adding circuit 22 is performed. Because of this, the selection of the LANE-CRC packet generating circuit 25 by the selector is performed temporarily for transmission of the LANE-CRC-DLLP.

The parallel-serial conversion circuit 23 divides the 8-byte data into pieces of 1-byte data, scrambles each of the divided pieces of data, and performs parallel-serial conversion of the scrambled pieces of data. Afterwards, data is transmitted serially for each lane.

In this manner, the data transmitter circuit 11a transmits the LANE-CRC-DLLP on the basis of the set insertion interval. Next, with reference to FIG. 3, details of the configurations of the data receiver circuit 22 according to the present embodiment are explained.

As illustrated in FIG. 3, the data receiving device 11b according to the present embodiment includes a serial-parallel converter circuit 31, a packet CRC check circuit 32, a count circuit 33, a decoder 34, CRC calculation circuits 35 (35-0 to 35-7) provided in each lane, comparison circuits 36 (36-0 to 36-7) provided in each lane, a mismatch count circuit 37 (37-0 to 37-7) provided in each lane, an error lane identifying unit 38, and a setting change instruction circuit 39.

The serial-parallel conversion circuit 31 receives data for each lane, performs serial parallel conversion, and descrambles the converted data. The 8-byte data obtained in this manner is output in parallel.

The packet CRC check circuit 32 extracts the CRC code from a single packet every time a single packet of data is input from the serial-parallel conversion circuit 31 and performs error detection by using the extracted CRC code and data other than the CRC code. The data other than the CRC code is also a portion of the single packet of data, but the STP and the END are removed, the CRC code is calculated by using this portion, and the calculated CRC code is compared with the extracted CRC code. As a result of this comparison, when the two CRC codes do not match one another, it is assumed that an error has occurred, and the packet CRC check circuit 32 activates an error signal.

The count circuit 33 counts the number of times that the packet CRC check circuit 32 activates the error signal. When the counter number of times (count value) exceeds a preset threshold, an over error threshold signal that indicates whether the number of times exceeds the threshold or not is activated. This over error threshold signal is input to the setting change instruction circuit 39.

The 8-byte data output in parallel from the serial-parallel conversion circuit 31 is input to each of the CRC calculation circuits 35-0 to 35-7. Similarly to the CRC calculation circuits 24-0 to 24-7 in FIG. 2, each of the CRC calculation circuits 35-0 to 35-7 inputs corresponding 1-byte data, and calculates a 4-bit CRC code. The CRC code is calculated every time the serial-parallel conversion circuit 31 outputs 8-byte data. As a result, the CRC codes of 8 lanes to be compared with the CRC codes of 8 lanes stored in the LANE-CRC-DLLP are calculated by each of the CRC calculation circuits 35-0 to 35-7.

The decoder 34 copes with the data output of the LANE-CRC-DLLP from the serial-parallel conversion circuit 31. When data of the LANE-CRC-DLLP is output from the serial-parallel conversion circuit 31, the decoder 34 extracts the CRC codes of 8 lanes and outputs each of the CRC codes to each of the corresponding comparison circuits 36. Consequently, each of the comparison circuits 36-0 to 36-7 compares the CRC code input from the decoder 34 with the CRC code calculated by the corresponding CRC calculation circuit 35, and outputs the comparison result. When the two CRC codes do not match, each of the comparison circuits 36-0 to 36-7 notifies a corresponding mismatch count circuit 37 of the result (mismatch) as a comparison result.

The decoder 34 resets each of the CRC calculation circuits 35-0 to 35-7 at a timing that does not influence the comparison in each of the comparison circuits 36-0 to 36-7 while outputting the CRC codes to each of the comparison circuits 36-0 to 36-7. As a result, the CRC codes are calculated from a packet subsequent to the LANE-CRC-DLLP.

Each of the mismatch count circuits 37-0 to 37-7 counts the number of times that the mismatch is reported by the corresponding comparison circuits 36. Every time the mismatch is reported, the number of times is incremented, and a signal with a logic value of 1 is output. As a result, the signal with the logic value of 1 from among the signals output by each of the mismatch count circuits 37-0 to 37-7 becomes information indicating whether an error has occurred in the corresponding lane or not. Accordingly, the signal output by the mismatch count circuits 37-0 to 37-7 is hereinafter referred to as "error information", and outputting of the signal with a logic value of 1, as this signal is hereinafter described, as error information is activated.

The error lane identifying unit 38 monitors the error information output from each of the mismatch count circuits 37-0 to 37-7, and notifies the setting change instruction circuit 39 of the mismatch count circuit 37 that activates the error information. The error lane identifying unit 38 outputs error lane information each of the mismatch count circuits 37, the error lane information is a signal indicating whether the error information is activated or not. The error lane identifying unit 38 makes the notification by, for example, activating the error lane information corresponding to the mismatch count circuit 37 that activated the error information. Here, the logic value of the activated error lane information is assumed to be 1.

Each piece of error lane information indicates whether an error has occurred in the corresponding lane or not. The setting change instruction circuit 39 receives the over error threshold signal from the error lane identifying unit 38 in addition to the input of the error lane information, and performs setting change of the serial-parallel conversion circuit 31.

The setting change instruction circuit 39 includes a setting designation unit 40. This setting designation unit 40 designates the content to be set in accordance with the error occurrence conditions in each lane. For that reason, the setting designation unit 40 includes a setting output unit 41 (41-0 to 41-7) to output the content to be set for each lane.

Each of the setting output units 41 includes registers 42 to 44, a selector 45, a counter 46, and an AND gate 47.

The content to be set (hereinafter referred to as "setting information") is stored in each of the registers 42 to 44. The selector 45 selects one of the registers 42 to 44 and outputs data stored in the selected register. The count value output from the counter 46 designates a register that is to be selected by the selector 45. The initial value of the counter 46 is 0, and when the count value of the counter 46 is 0, the selector 45 selects the register 42. Similarly, the selector 45 selects the register 43 when the count value of the counter 46 is 1 and selects the register 44 when the count value is 2.

The setting change instruction circuit 39 instructs the serial-parallel conversion circuit 31 to perform the setting change in response to the increment of the count value of the counter 46. The setting information of the register newly selected by the selector 45 in accordance with the incremented count value is provided to the serial-parallel conversion circuit 31 as the setting information to be newly set in a lane where an error is currently detected. As a result, the setting change of the lane where an error is detected is performed. The count value of the count circuit 33 is reset by, for example, the serial-parallel conversion circuit 31, after the setting change.

As described above, in the present embodiment, it is possible to detect a lane in which an error occurred, and therefore the setting change of the lane in which the error is detected is performed on an as-needed basis. For that reason, it is possible to individually optimize the setting of each lane so as not to cause an error. As a result, a more correct data transmission can be realized.

The counter 46 counts the number of times that the logic value of the logical AND output from the AND gate 47 is 1. The AND gate 47 outputs the logical AND of the over error threshold signal output from the count circuit 33 and the error lane information. The over error threshold signal becomes active when the number of errors detected on a packet basis exceeds a threshold. The error lane information becomes active when an error is detected in the corresponding lane. For that reason, the number of times (count value) that the counter 46 in each of the setting output units 41-0 to 41-7 counts is the number of detections of the error that occurred in the corresponding lane under a situation in which the number of packets in which errors have occurred exceeds a threshold.

In the present embodiment, as described above, the over error threshold signal being activated is a precondition of setting change. This is to avoid the setting change in response to an error occurrence within an allowable range because it is difficult to completely prevent an error occurrence in a packet transmission. By setting this precondition, it is possible to prevent changing a setting that is actually proper to another setting.

FIG. 4 is a diagram explaining details of the transmission system. As illustrated in FIG. 4, the parallel-serial conversion circuit 23 in FIG. 2 includes Serdes (SERializer/DESirializer) Macro circuits 50 (50-0 to 50-7) for each lane 3a. The serial-parallel conversion circuit 31 in FIG. 3 also includes Serdes Macro circuits 60 (60-0 to 60-7) for each lane 3a. The lane 3a includes a pair of transmission lines.

Each of the Serdes Macro circuits 50-0 to 50-7 in the parallel-serial conversion circuit 23 includes a serializer for converting parallel data into serial data and a transmitter circuit 52 for outputting the serial data on the lane 3a.

Meanwhile, each of the Serdes Macro Circuits 60-0 to 60-7 in the serial-parallel conversion circuit 31 includes an LE (Linear Equalizer) 61, a DFE (Decision Feedback Equalizer) 62, and a deserializer 63.

The LE 61 improves signal quality by amplifying attenuated high-frequency components of the serial data received thought the lane 3a with respect to polarity in accordance with the setting of the amplification factor of each polarity. The DFE 62 improves the signal quality by using the past received data (signal). The deserializer 63 converts the serial data output from the DFE 62 into parallel data. As a result, the serial-parallel conversion circuit 31 outputs 8-byte parallel data.

FIG. 5 is a diagram explaining a configuration of the DFE. As illustrated in FIG. 5, the DFE 62 includes a subtracter 71, three buffers 72 to 74, and three amplifiers 75 to 77.

The buffers 72 to 74 store subtraction results of different times from the subtracter 71. The amplifiers 75 to 77 multiply the subtraction results stored in the buffers 72 to 75 by a tap coefficient (denoted as "DFE gain/tap" in FIG. 5) that is a preset amplification factor. The subtracter 71 subtracts the multiplication result output from the amplifiers 75 to 77 from a 1-bit value input from the LE 61. This subtraction result becomes an output signal of the DFE 62, and is stored in the buffer 72. In this manner, the DFE 62 removes an interference component of the past received data from the currently received data.

When the serial-parallel conversion circuit 31 carries the Serdes Macro circuits 60-0 to 60-7 including the DFE 62 as illustrated in FIG. 5, the setting information stored in each of the registers 42 to 44 in FIG. 3 is information relating to the LE 61 and the DFE 62 (such as information to designate the amplification factor etc.). The initial value of the counter 46 is 0, and since the selector 46 selects the register 42 when the count value of the counter 46 is 0, the register 42 stores the setting information of the content to be set initially (denoted as "SETTING A (default)" in FIG. 3; hereinafter referred to as "default information"). The register 43 stores the setting information of the content to be set subsequent the default information (denoted as "SETTING B (auxiliary)"; hereinafter referred to as "first change setting information"). The register 44 stores setting information of the content to be set subsequent to the first change setting information (denoted as "SETTING C (auxiliary)"; hereinafter referred to as "second change setting information").

The DFE 62 consumes a relatively large amount of power. For that reason, the prepared setting information may include content to designate whether the DFE 62 is operated (enabled) or not. When such setting information is set as a default, the DFE 62 is operated on an as needed basis, and therefore it is effective to reduce the power consumption.

The content of the setting information depends on the configuration of the packet receiver end. The configuration of the receiver end is not limited to the configuration illustrated in FIG. 4. For example, as an equalizer, there are types of equalizers other than LE and DFE (e.g., CTLE (Continuous-Time Linear Equalizer)). In addition, a mechanism to automatically change the tap coefficient in the DFE (hereinafter referred to as "automatic change mechanism") may be loaded in many cases. For this reason, a method of changing the tap coefficient may be changed by the setting information. Considering these circumstances, the setting information is not particularly limited.

In the present embodiment, since each of the three registers 42 to 44 can store different setting information, two types, the first and the second change setting information, are prepared as the setting information to be changed. However, the setting information to be changed is not limited to these two types.

As described above, with the precondition that the over error threshold signal is activated, the setting change is performed when the packet CRC check circuit 32 detects an error that exceeds a threshold. However, even if the data transmission is properly carried out, the packet CRC check circuit 32 could detect an error that exceeds a threshold over a very long time period. Alternately, when the DFE 62 and the above-described automatic change mechanism are installed, since the data transmission that causes errors often causes errors in the subsequent data transmission, it is possible for a number of errors to be caused within a short period of time (burst error). For that reason, the present embodiment performs the error measurement using the count circuit 33 in the following manner. Details are explained with reference to FIG. 9.

Figure 9:
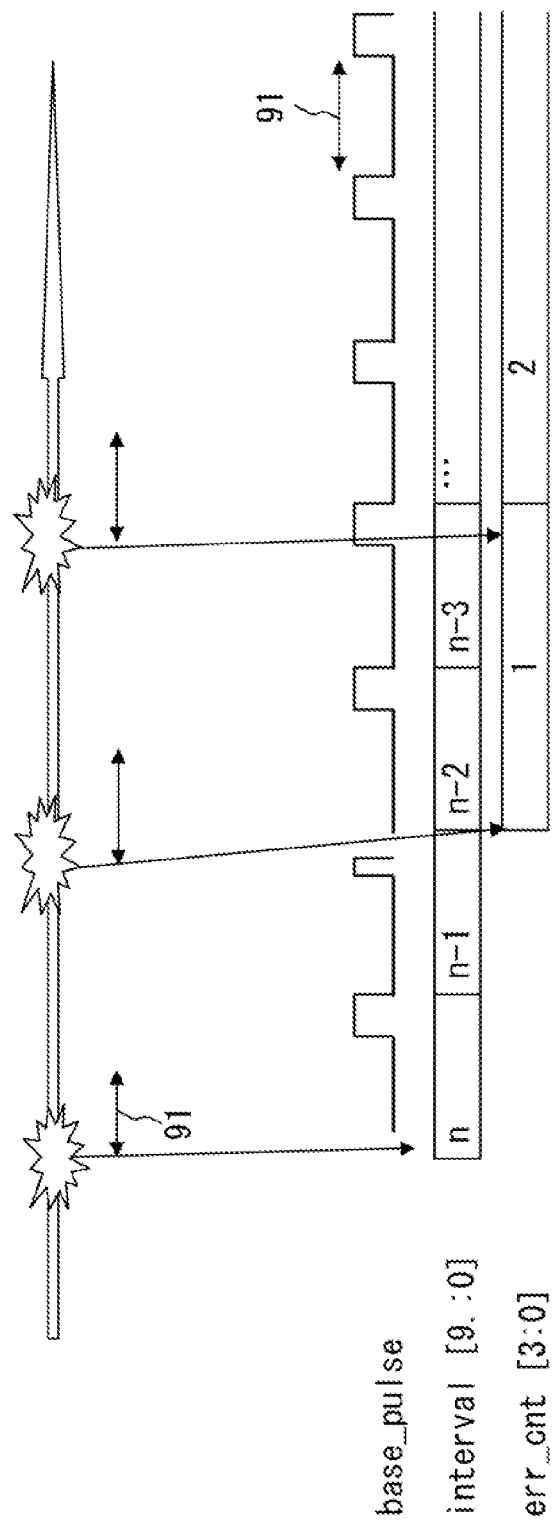
FIG. 9 is a diagram explaining a method of error measurement in the present embodiment.

FIG. 9 is a diagram explaining a method of error measurement in the present embodiment. In FIG. 9, "base_pulse", "interval[9:0]", and "err_cnt[3:0]" represent a pulse signal that becomes H (logic value becomes 1) every time a preset time period has elapsed, a value to identify a unit of measurement of a time period that is a unit of the error measurement, and a count value of the count circuit 33, respectively. An arrow with marks labeled 81 represents the flow of time. The marks labeled 81 represent by their location the timing at which the error occurred.

In the present embodiment, by controlling the operation of the count circuit 33 by using a pulse signal base_pulse, the number of errors that the count circuit 33 can measure is only one during an L period 91 in which the level of the pulse signal base_pulse is L. As a result, even if a burst error occurs, the count circuit 33 increments the count value only once during the L period 91. For that reason, a setting change caused by the burst error, which is in practice unnecessary, can be reduced.

The LANE-CRC-DLLP is transmitted from the transmitter end at preset insertion intervals as illustrated in FIG. 7. For that reason, in the detection of a lane in which an error has occurred by using the LANE-CRC-DLLP, the burst error can also be handled similarly to the error detection by using the pulse signal base_pulse.

A value interval [9:0] is decremented every time the pulse signal base_pulse becomes H. In FIG. 9, "n" represents an initial value, and the unit measurement period is a time period identified by the initial value n and a cycle of the pulse signal base_pulse. The value interval [9:0] being 0 indicates the elapse of the unit measurement period, and the decrement ends when the value becomes 0.

More precisely, in the present embodiment, whether the number of errors that occurred in this unit measurement period exceeds the threshold provided to the count circuit 33 or not is the precondition of the setting change. As a result, the count value of the count circuit 33 is used as a value of BER (Bit Error Rate).

For that reason, the count value of the count circuit 33 is reset to the initial value (=0) when the count circuit 33 does not activate the over error threshold signal before the value interval [9:0] becomes 0. When the count circuit 33 activates the over error threshold signal, the count value of the count circuit 33 is reset to the initial value after setting changes in the LE 61 and the DFE 62 are carried out. With this resetting, the over error threshold signal becomes inactive.

When the setting change of the LE 61 and the DFE 62 is carried out, the retraining of the DFE 62 follows and after the retraining, the normal data transmission is resumed. For that reason, when the count circuit 33 activates the over error threshold signal, resetting of the count value of the count circuit 33 is performed at the time of resuming the normal data transmission. This resetting is carried out, for example, by the serial-parallel conversion circuit 31 at the end of retraining.

The operation control of the count circuit 33 by using the pulse signal base_pulse can be realized when the packet CRC check circuit 32 activates the error signal within the L time period 91 by, for example, maintaining the state until the level of the pulse signal base_pulse next becomes H.

The count circuit 33 counts the number of times that the error signal becomes active, and if the number of times exceeds a threshold, the count circuit 33 activates the over error threshold signal. Therefore the decrement of the value interval [9:0] may be carried out by the count circuit 33. In such a case, the decrement of the value interval [9:0] can be started under a condition in which the error signal becomes active in a situation in which the decrement is not carried out. When the value interval [9:0] becomes 0 without activating the over error threshold signal, the count circuit 33 itself may reset the count value, may set the initial value n to the value interval [9:0], and may stop the decrement. When the over error threshold signal becomes active, the setting of the initial value n to the value interval [9:0] and the stopping of the decrementing may be performed together at the time of resetting the count value of the count circuit 33.

When an acceptable range is up to 8 errors in 100 seconds at 10 Gbps, for example, one cycle of the pulse signal base_pulse is a time required to transmit and receive data of $10^9$ symbols (1 symbol=10 bits), and the initial n may be set as 100. The threshold to determine whether or not to activate the over error threshold signal may be set to 7.

It should be noted that in the present embodiment, the data transmitting/receiving device 11 is incorporated into the CPU 2. However, the semiconductor devices (LSI: Large Scale Integration) that carry the data transmitting/receiving device are not limited to the CPU 2. It is possible to incorporate the data transmitting/receiving device 11 in a GPU (Graphics Processing Unit).

In the present embodiment, the setting change in units of lanes is performed at the receiver end. However, in a case of highly frequent error occurrence due to failures, or more specifically, when for example errors beyond the acceptable range are caused, degeneracy to stop the lane with highly frequent errors may by performed automatically. In the configuration illustrated in FIG. 3, for example, the degeneracy may be performed when the count value of the counter 46 is 3 or larger. The CRC code (error-detecting code) to detect the line in which the error occurred is stored in the LANE-CRC-DLLP and is transmitted from the transmitter end to the receiver end. However, such a CRC code may be transmitted to the receiver end using other methods. For example, under a situation in which there is no packet to be transmitted, or there are relatively few packets to be transmitted, it is possible to transmit the CEC code by using only one lane 3a.

The present embodiment assumes a case of detecting, while the system is in operation, a lane (transmission path) in which an error occurred. However, the detection of the lane in which the error occurred enables optimization of the setting in each of the lanes. For that reason, the detection of the lane in which the error occurred may be performed for the purpose of setting (adjusting) the system. In other words, the detection of the lane in which the error occurred may not be performed while the system is in operation.

The data processing device 1 in the present embodiment corresponds to the above-stated system. However, the data transmitting/receiving device 11 of the present embodiment can be used for data transmission between data processing devices. In such a case, the system includes plural data processing devices. Thus, the data processing device may be plural data processing devices connected with one another.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A data receiving device for receiving divided transmission data transmitted from a data transmitting device through a plurality of transmission paths, the divided transmission data including the divided data that is transmission target data divided for each transmission path used for data transmission from among the plurality of transmission paths and error detection information generated from the divided data to detect an error, the data receiving device comprising:
    a timing signal generation unit that generates a timing signal used for receiving the divided transmission data in each of the transmission paths;
    a data receiving unit that receives the divided transmission data transmitted by the data transmitting device for each of the transmission paths by using the timing signal generated by the timing signal generation unit; and
    an error detection unit that extracts the error detection information from the divided transmission data received for each of the transmission paths by the data receiving unit, detects an error of transmission data included in the divided transmission data by using the extracted error detection information in order to identify a transmission path in which the error of transmission data has occurred, and stops the transmission path.

2. The data receiving device according to claim 1, further comprising:
    a setting unit that changes an interval of the timing signal generated by the timing signal generation unit in each of the transmission paths based on an error detection result of the error detection unit.

3. The data receiving device according to claim 2, further comprising:
    an error count unit that counts a number of times of the error detected by the error detection unit in each of the transmission paths, wherein
    the setting unit changes the interval of the timing signal generated by the timing signal generation unit in accordance with the number of times of error detection in each of the transmission paths counted by the error count unit.

4. A data transmitting/receiving device connected to another data transmitting/receiving device through a plurality of transmission paths, the data transmitting/receiving device comprising:
    a data transmitting unit that transmits divided data that is transmission target data to be transmitted to the another data transmitting/receiving device being divided for each of the transmission paths used for data transmission from among the plurality of transmission paths;
    an error detection information generation unit that generates error detection information used when the another data transmitting/receiving device detects an error in each of the transmission paths based on the divided data transmitted from the data transmitter unit;
    a transmission controlling unit that causes the data transmitting unit to transmit divided transmission data that includes the divided data and the error detection information;
    a timing signal generation unit that generates a timing signal used for receiving the divided transmission data from the another data transmitting/receiving device for each of the transmission paths;
    a data receiving unit that receives the divided transmission data transmitted by the another data transmitting/receiving device in each of the transmission paths based on the timing signal generated by the timing signal generation unit; and
    an error detection unit that detects an error of transmission data included in the divided transmission data by using error detection information extracted from the divided transmission data received by the data receiving unit in each of the transmission paths in order to identify a transmission path in which the error of transmission data has occurred, and stops the transmission path.

5. The data transmitting/receiving device according to claim 4, further comprising:
    a setting unit that changes an interval of the timing signal generated by the timing signal generation unit in each of the transmission paths based on an error detection result of the error detection unit.

6. The data transmitting/receiving device according to claim 5, further comprising:
    an error count unit that counts a number of times of the error detected by the error detection unit in each of the transmission paths, wherein
    the setting unit changes the interval of the timing signal generated by the timing signal generation unit in accordance with the number of times of error detection in each of the transmission paths counted by the error count unit.

7. A controlling method of a data transmitting/receiving device connected to another data transmitting/receiving device through a plurality of transmission paths, the controlling method comprising:
    generating divided data by the data transmitting/receiving device, the divided data is transmission target data divided for each transmission path used for data transmission from among the plurality of transmission paths, the transmission target data being transmitted from the data transmitting/receiving device to the another data transmitting/receiving device;
    generating error detection information by the data transmitting/receiving device for the another data transmitting/receiving device to detect an error in each of the transmission paths based on the generated divided data;
    transmitting divided transmission data from the data transmitting/receiving device to the another data transmitting/receiving device, the divided transmission data includes the divided data and the error detection information;

generating a timing signal for each of the transmission paths by the another data transmitting/receiving device, the timing signal being used for receiving the divided transmission data received from the data transmitting/receiving device; receiving the divided transmission data received from the data transmitting/receiving device in each of the transmission paths by the another data transmitting/receiving device by using the generated timing signal; and detecting an error of transmission data included in the divided transmission data by the another data transmitting/receiving device by using the error detection information extracted from the divided transmission data received in each of the transmission paths in order to identify a transmission path in which the error of transmission data has occurred, and stops the transmission path.

* * * * *